United States Patent Office.

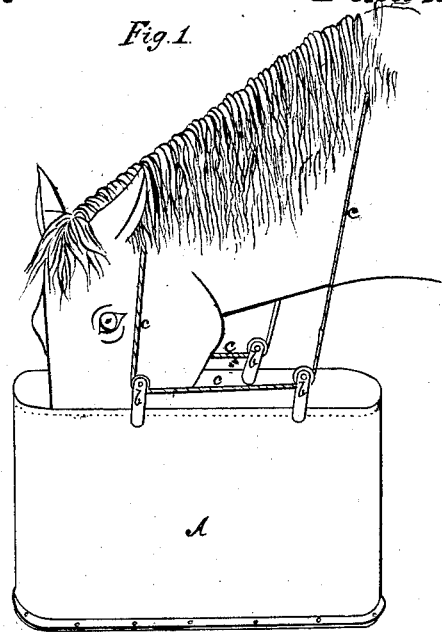
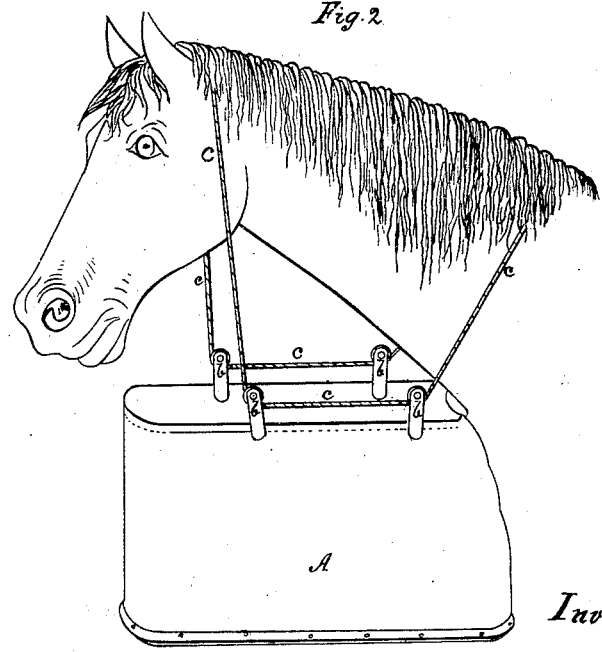

CHARLES CHINNOCK, OF BROOKLYN, NEW YORK, ASSIGNOR TO J. LITTLE HYDE, OF NEW YORK CITY.

*Letters Patent No. 82,088, dated September 15, 1868.*

IMPROVED FEED-BAG.

The Schedule referred to in these Letters Patent and making part of the same.

TO ALL WHOM IT MAY CONCERN:

Be it known that I, CHARLES CHINNOCK, of the city of Brooklyn, in the county of Kings, and State of New York, have invented a new and useful Improvement in Feed-Bags; and I do hereby declare that the following is a full, clear, and exact description of the same, reference being had to the accompanying drawings, forming part of this specification, in which—

Figure 1 represents a longitudinal view of a feed-bag constructed according to my improvement, showing the position of the bag upon the horse while feeding, or with his head down, and Figure 2 represents a view of the same, showing the position of the bag upon the horse when the head is elevated—

Similar letters of reference indicating corresponding parts in both figures.

My invention consists in a feed-bag, so constructed, with a cord and pulleys or slides, that when it is suspended upon the head and neck of a horse, it is rendered self-adjusting, in such manner as to preclude the possibility, during all movements, of the throwing out and wasting his feed.

In order that others may be better enabled to understand the construction and operation of my invention, I will proceed to describe it with reference to the drawings.

A is a feed-bag, of somewhat elongated formation, constructed of cloth, or any suitable material, but preferably a stiff bottom.

$b\ b\ b\ b$ are pulleys, attached to the upper edge of the bag A, and at suitable locations thereon, to enable the bag to hang level when suspended therefrom.

$c$ is a cord, passing through the pulleys $b$, and united at its ends, and of such a length, and so adjusted in and through the said pulleys $b$ as to form a loop in each direction lengthwise of the bag A, and beyond the said pulleys $b$, and of sufficient length to pass over the horse's head and suspend the bag at a desirable distance below.

In the operation of this invention, the said loops thus formed with the cord $c$ are placed over the head of the horse, the first loop being adjusted upon the horse's withers, and the next behind his ears, and may be secured respectively to the collar and headstall, or otherwise secured, as may be desirable. The feed having been placed within the bag, which may be done before or after its adjustment upon the horse, provides a weight sufficient to cause the bag, in whatever position the horse's head is moved, to occupy the lowest part of the cord $c$, by means of the pulleys $b$ moving along said cord, and by which means the bag A is always kept in a horizontal or nearly horizontal position, whatever may be the position of the horse's head, and as the bag is scarcely affected by any sudden movements of the head, the horse is prevented from throwing out and wasting his feed.

Slides may be substituted for the pulleys $b\ b$, but the pulleys are preferable, as they work with less friction on the cord.

What I claim as my invention, and desire to secure by Letters Patent, is—

The combination of the endless cord $c$ and pulleys or slides $b$ with the feed-bag A, all arranged and operating essentially as set forth.

CHS. CHINNOCK.

Witnesses:
　ED. P. TRACY,
　A. LE CLERC.